(12) United States Patent  
Kimura et al.

(10) Patent No.: US 10,895,322 B2  
(45) Date of Patent: Jan. 19, 2021

(54) PARKING DEVICE

(71) Applicant: TOYOTA JIDOSHA KABUSHIKI KAISHA, Toyota (JP)

(72) Inventors: Hiroaki Kimura, Toyota (JP); Kensuke Akimoto, Nagakute (JP); Ryoki Il, Toyota (JP); Kenji Asai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/282,961

(22) Filed: Feb. 22, 2019

(65) Prior Publication Data

US 2019/0264807 A1    Aug. 29, 2019

(30) Foreign Application Priority Data

Feb. 27, 2018   (JP) ................................. 2018-033788

(51) Int. Cl.
*F16H 63/34*    (2006.01)

(52) U.S. Cl.
CPC ................................. *F16H 63/3425* (2013.01)

(58) Field of Classification Search
CPC ............................. F16H 63/3425; F16H 63/34
See application file for complete search history.

(56) References Cited

U.S. PATENT DOCUMENTS

| | | | | |
|---|---|---|---|---|
| 4,671,133 A | * | 6/1987 | Yamada | ................. B60T 1/005 188/31 |
| 2009/0038430 A1 | | 2/2009 | Itazu et al. | |
| 2013/0313066 A1 | | 11/2013 | Takahashi et al. | |

FOREIGN PATENT DOCUMENTS

| | | |
|---|---|---|
| CN | 102865362 A | 1/2013 |
| CN | 204127302 U | 1/2015 |
| JP | 63150863 U | 10/1988 |
| JP | 63154374 U | 10/1988 |
| JP | 11-020632 A | 1/1999 |
| JP | 2009-041679 A | 2/2009 |
| JP | 2011-213213 A | 10/2011 |
| WO | 2012111080 A1 | 8/2012 |

OTHER PUBLICATIONS

Partial Translation of Communication dated Nov. 17, 2020, from the Japanese Patent Office in Application No. 2018-033788.

* cited by examiner

*Primary Examiner* — Huan Le

(74) *Attorney, Agent, or Firm* — Sughrue Mion, PLLC

(57) ABSTRACT

A parking device includes a parking gear, a parking pawl, and a torsion spring. The parking gear is directly coupled to an axle. The parking pawl is pivotably supported by a fulcrum pin and provided with a claw configured to be able to mesh with a tooth space of the parking gear. The torsion spring is fitted on the fulcrum pin, with a first end of the torsion spring mounted on the parking pawl and a second end of the torsion spring mounted on a holding member that holds the fulcrum pin.

2 Claims, 4 Drawing Sheets

PARKING DEVICE

CROSS-REFERENCE TO RELATED APPLICATIONS

This application claims priority to Japanese Patent Application No. 2018-033788 filed on Feb. 27, 2018, which is incorporated herein by reference in its entirety.

BACKGROUND

1. Technical Field

The present disclosure relates to a parking device.

2. Description of Related Art

Japanese Patent Application Publication No. 2009-041679 discloses a parking device including a parking gear that is directly coupled to an axle, and a parking pawl that is pivotably supported by a fulcrum pin and provided with a claw capable of meshing with a tooth space formed between adjacent ones of gear teeth provided on an outer circumference of the parking gear. By pivoting about the fulcrum pin, the parking pawl can shift between an engaged position in which the tooth space of the parking gear and the claw are meshed and engaged with each other and a disengaged position in which the claw is disengaged from the tooth space of the parking gear.

SUMMARY

In a parking device, urging the parking pawl by a torsion spring in a direction away from the parking gear can suppress vibration of the parking pawl located in the disengaged position. However, when the torsion spring urging the parking pawl is fitted on a shaft member that is intended solely for the purpose of supporting the torsion spring, providing the shaft member may result in an increase in size of the parking device.

The present disclosure provides a parking device that can achieve downsizing.

According to an aspect of the present disclosure, a parking device including a parking gear, a parking pawl, and a torsion spring is provided. The parking gear is directly coupled to an axle. The parking pawl is pivotably supported by a fulcrum pin and provided with a claw configured to be able to mesh with a tooth space of the parking gear. The torsion spring is fitted on the fulcrum pin and includes a first end of the torsion spring mounted on the parking pawl and a second end of the torsion spring mounted on a holding member configured to hold the fulcrum pin. The second end is positioned on an opposite side of the torsion spring from the first end.

In the parking device, the fulcrum pin may be provided with a restriction part configured to restrict a movement of the torsion spring away from the parking pawl in an axial direction of the fulcrum pin.

The parking device can prevent the torsion spring from coming off while achieving a cost reduction.

In the above parking device, the restriction part may be a large-diameter portion that is provided at an end of the fulcrum pin, an outside diameter of the large-diameter portion being larger than am outside diameter of the torsion spring. The restriction part may be configured such that the movement of the torsion spring away from the parking pawl is restricted as the torsion spring butts against a side surface of the large-diameter portion in the axial direction of the fulcrum pin.

The parking device can prevent the torsion spring from coming off by a simple configuration.

Moreover, in the above parking device, the restriction part may be a portion including protrusions that are provided on an outer circumferential surface of an end of the fulcrum pin so as to be arrayed in a circumferential direction. An outside diameter of the protrusions may is larger than an outside diameter of the torsion spring. The restriction part may be configured such that the movement of the torsion spring away from the parking pawl is restricted as the torsion spring butts against the protrusions in the axial direction of the fulcrum pin.

The parking device according to each aspect of the present disclosure has an advantage in that it can achieve downsizing by eliminating the need for a shaft member that is intended solely for the purpose of supporting a torsion spring.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of a parking device according to the present disclosure will be described below. However, the present disclosure is not limited by this embodiment.

Figure 1:
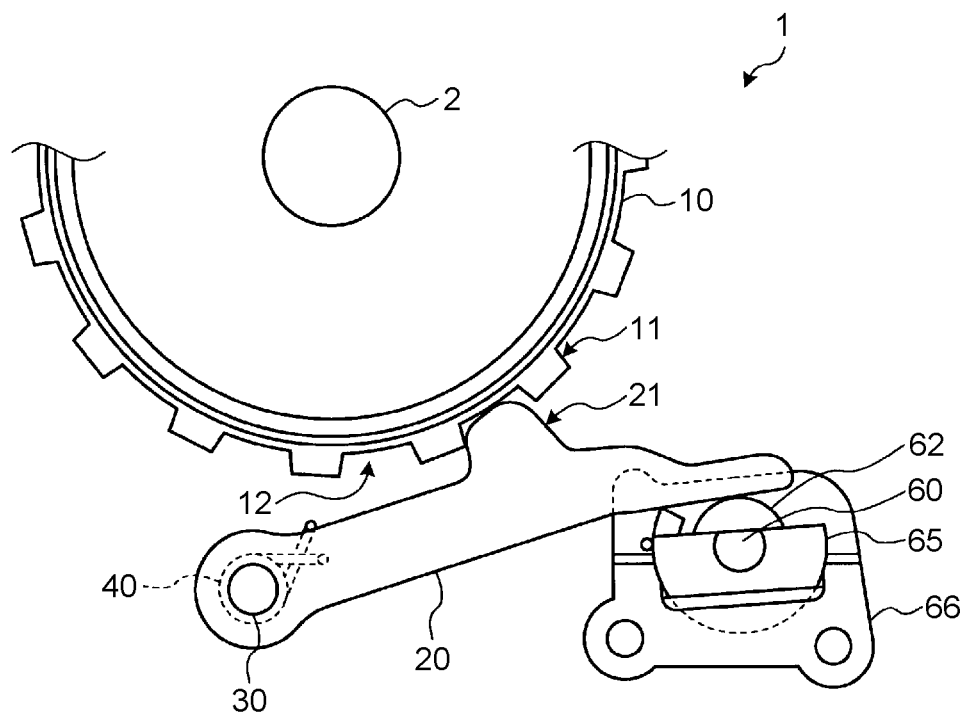
FIG. 1 is a view showing a schematic configuration of a parking device according to an embodiment of the present disclosure.
Figure 2:
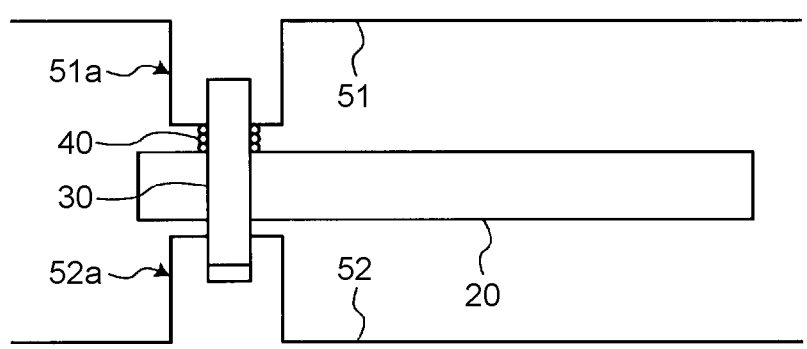
FIG. 2 is a schematic view showing how a parking pawl is supported in the embodiment.

FIG. 1 is a view showing a schematic configuration of a parking device 1 according to the embodiment. FIG. 2 is a schematic view showing how a parking pawl 20 is supported in the embodiment. As shown in FIG. 1, the parking device 1 according to the embodiment includes a parking gear 10 and the parking pawl 20. The parking gear 10 is directly coupled to an axle 2. The parking pawl 20 is provided with a claw 21 that can mesh with a tooth space 12 of the parking gear 10.

A plurality of gear teeth 11 is provided on an outer circumference of the parking gear 10, at predetermined intervals along a circumferential direction. The parking pawl 20 is pivotably supported by a parking pawl fulcrum pin 30 that is provided at one end of the parking pawl 20. The claw 21 of the parking pawl 20 is provided at a position which is roughly at a center of the parking pawl 20 in a longitudinal direction and at which the claw 21 faces the outer circumference of the parking gear 10. By pivoting about the parking pawl fulcrum pin 30, the parking pawl 20 can shift between an engaged position in which the tooth space 12 of the parking gear 10 and the claw 21 are meshed and engaged with each other and a disengaged position in which the claw 21 is disengaged from the tooth space 12 of the parking gear 10. Here, the parking pawl fulcrum pin is an example of the "fulcrum pin" of the present disclosure.

As shown in FIG. 2, one end of the parking pawl fulcrum pin 30 is held by a housing boss 51a that is provided on a housing 51. The other end of the parking pawl fulcrum pin 30 is held by a case boss 52a that is provided on a case 52. A torsion spring 40 is fitted on a part of the parking pawl fulcrum pin 30 between the parking pawl 20 and the housing 51. One end of the torsion spring 40 is mounted on the housing boss 51a. The other end of the torsion spring 40 is mounted on the parking pawl 20. The housing boss 51a prevents the torsion spring 40 from coming off from the one end side. The parking pawl 20 prevents the torsion spring 40 from coming off from the other end side. Here, the housing boss is an example of the "holding member" of the present disclosure.

The parking pawl 20 is urged by the torsion spring 40 in a direction away from the parking gear 10. Thus urging the parking pawl 20 by the torsion spring 40 can suppress vibration of the parking pawl 20 while the parking pawl 20 is located in the disengaged position.

Figure 3:
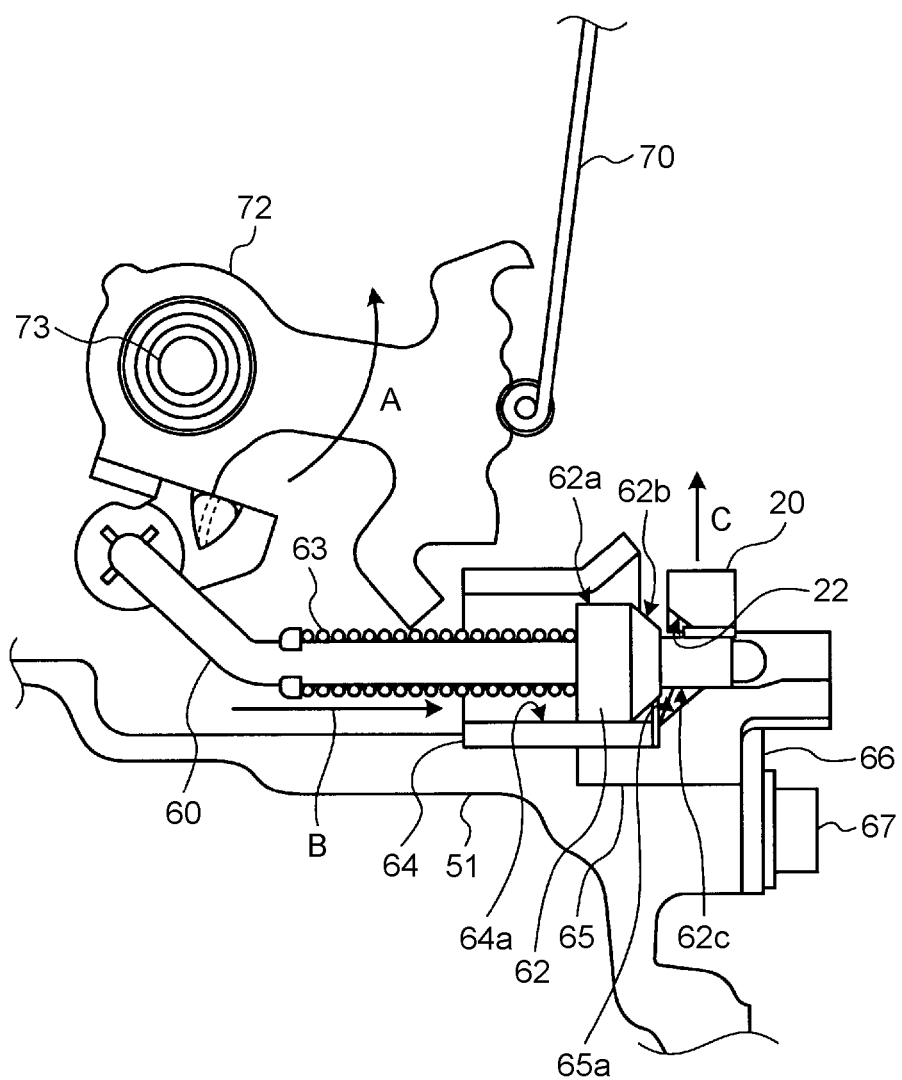
FIG. 3 is a view illustrating an operation of the parking device according to the embodiment.

FIG. 3 is a view illustrating an operation of the parking device 1 according to the embodiment. As shown in FIG. 3, the parking device 1 includes a detent spring 70, a detent plate 72 that pivots about a rotating shaft 73, a parking rod 60 that moves as the detent plate 72 pivots, etc. A cam member 62 that has a conical shape and can move forward and backward in an axial direction of the parking pawl fulcrum pin 30 is provided on the parking rod 60, near a leading end thereof. A spring 63 is fitted on the parking rod 60, adjacent to the cam member 62. The cam member 62 has a cam surface 62b that is tapered such that the diameter decreases gradually from a large-diameter base end 62a toward a small-diameter leading end 62c.

The cam surface 62b of the cam member 62 can come into contact with a cam surface 22 provided at the other end of the parking pawl 20. Specifically, when the shift position is a position other than a park (P) position (e.g., a reverse (R) position, neutral (N) position, or drive (D) position), the cam surface 62b of the cam member 62 is not in contact with the cam surface 22 of the parking pawl 20. On the other hand, when the shift position is the P-position, the cam surface 62b of the cam member 62 is in contact with the cam surface 22 of the parking pawl 20.

As shown in FIG. 3, a stopper plate 66 is fixed to the housing 51 with a bolt 67. The stopper plate 66 is an annular body having an opening, and a part of a second guide sleeve 65 is inserted in this opening. Thus, as the stopper plate 66 and the second guide sleeve 65 come into contact with each other, the second guide sleeve 65 is prevented from turning as well as from slipping out of the housing 51.

The cam member 62 is disposed so as to be able to move into and out of a first guide sleeve 64 and the second guide sleeve 65. A first guide surface 64a that guides the cam member 62 in the same direction as an axial direction of the cam member 62 is formed inside the first guide sleeve 64. A second guide surface 65a is provided inside the second guide sleeve 65. As shown in FIG. 3, the second guide surface 65a is formed as a slope that rises from the side of the base end 62a toward the side of the leading end 62c in the axial direction of the cam member 62.

When the shift position is switched from a shift position other than the P-position to the P-position as a driver performs a shifting operation by a shift lever (not shown) etc., the detent plate 72 pivots about the rotating shaft 73 through the detent spring 70 in the direction of arrow A in FIG. 3, causing the parking rod 60 to move in the direction of arrow B in FIG. 3. As the parking rod 60 moves in the direction of arrow B in FIG. 3, the cam member 62 moves forward inside the first guide sleeve 64 and the second guide sleeve 65 and ascends the second guide surface 65a of the second guide sleeve 65. Then, the cam surface 62b of the cam member 62 and the cam surface 22 of the parking pawl 20 come into contact with each other, and the parking pawl 20 is pushed up by the cam member 62 in the direction of arrow C in FIG. 3 against the urging force of the torsion spring 40. Thus, the parking pawl 20 pivots about the parking pawl fulcrum pin 30 from the disengaged position to the engaged position, and the claw 21 of the parking pawl 20 and the tooth space 12 of the parking gear 10 engage with each other. This is a parking lock state where rotation of the axle 2 on which the parking gear 10 is provided is restricted.

On the other hand, when the shift position is switched from the P-position to a shift position other than the P-position as the driver performs a shifting operation, the detent plate 72 pivots about the rotating shaft 73 through the detent spring 70 in the opposite direction from the direction of arrow A in FIG. 3, causing the parking rod 60 to move in the opposite direction from the direction of arrow B in FIG. 3. As the parking rod 60 moves in the opposite direction from the direction of arrow B in FIG. 3, the cam member 62 moves backward inside the first guide sleeve 64 and the second guide sleeve 65 and descends the second guide surface 65a of the second guide sleeve 65. Then, the cam surface 62b of the cam member 62 comes away from the cam surface 22 of the parking pawl 20, and the parking pawl 20 is pushed down in the opposite direction from the direction of arrow C in FIG. 3 by the urging force of the torsion spring 40. Thus, the parking pawl 20 pivots about the parking pawl fulcrum pin 30 from the engaged position toward the disengaged position, and the claw 21 of the parking pawl 20 is disengaged from the tooth space 12 of the parking gear 10. This is a parking unlock state where rotation of the axle 2 on which the parking gear 10 is provided is allowed.

Figure 4:
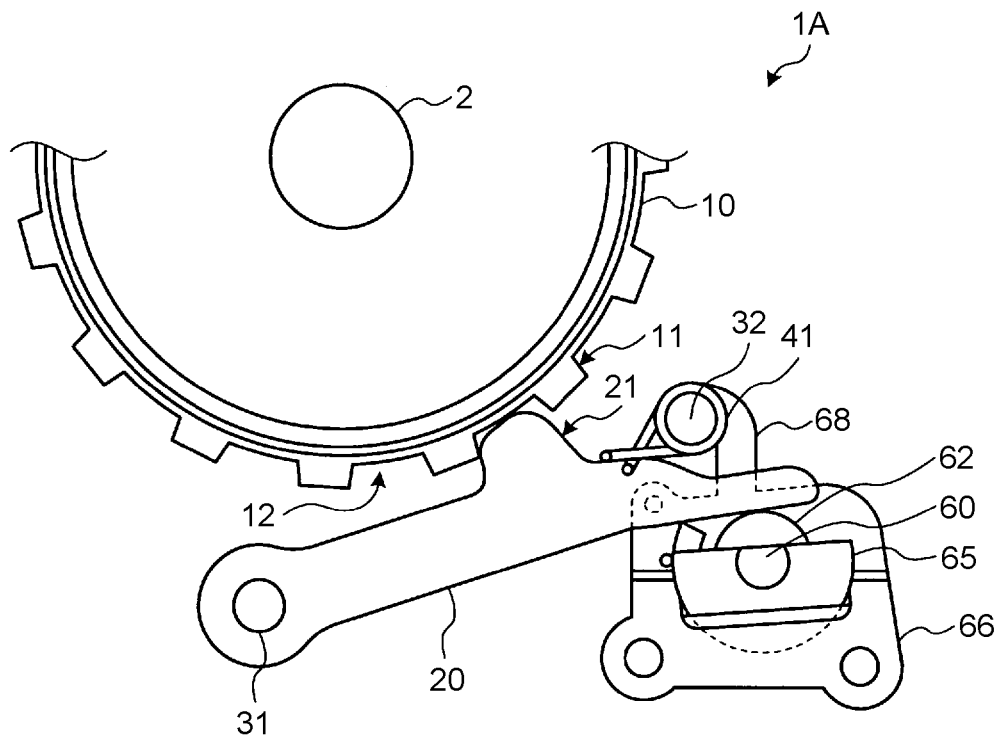
FIG. 4 is a view showing a schematic configuration of a parking device according to a related art of the embodiment.
Figure 5:
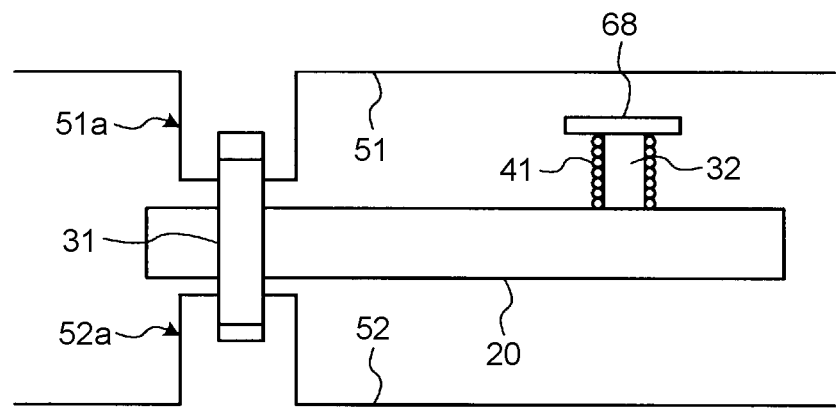
FIG. 5 is a schematic view showing how the parking pawl is supported in a comparative example.

FIG. 4 is a view showing a schematic configuration of a parking device 1A according to a comparative example of the embodiment. FIG. 5 is a schematic view showing how the parking pawl 20 is supported in the comparative example. Those members that the parking device 1A according to the related art has in common with the parking device 1 according to the embodiment are denoted by the same reference signs.

In the parking device 1A according to the comparative example, the parking pawl 20 is pivotably supported by a parking pawl fulcrum pin 31 of which one end is held by the housing boss 51a and the other end is held by the case boss 52a. As can be seen from FIG. 5, a torsion spring that urges the parking pawl 20 is not fitted on the parking pawl fulcrum pin 31 in the parking device 1A according to the comparative example.

As shown in FIG. 4, in the parking device 1A according to the comparative example, a torsion spring 41 is fitted on a spring support pin 32 of which one end is held by a support pin holding part 68 provided at an upper part of the stopper plate 66. One end of the torsion spring 41 is mounted on the support pin holding part 68, and the other end of the torsion spring 41 is mounted on the parking pawl 20. The support pin holding part 68 prevents the torsion spring 41 from coming off from the one end side.

The parking pawl 20 is urged by the torsion spring 41 in a direction away from the parking gear 10. Thus urging the parking pawl 20 by the torsion spring 41 can suppress vibration of the parking pawl 20 while the parking pawl 20 is located in the disengaged position.

On the other hand, in the parking device 1A according to the comparative example, the torsion spring 41 urging the parking pawl 20 is fitted on the spring support pin 32 that is a shaft member intended solely for the purpose of supporting the torsion spring 41. Thus, compared with the parking device 1 according to the embodiment, the parking device 1A according to the comparative example is additionally provided with the spring support pin 32 and the support pin holding part 68 having the function of preventing the torsion spring 41 from coming off the spring support pin 32, which results in an increase in size of the parking device 1A.

In the parking device 1 according to the embodiment, by contrast, the torsion spring 40 is fitted as described above on the parking pawl fulcrum pin 30 that pivotably supports the parking pawl 20, which can eliminate the need for additionally providing a shaft member that is intended solely for the purpose of supporting the torsion spring 40 or a coming-off prevention member that prevents the torsion spring 40 from coming off the shaft member. Thus, the parking device 1 according to the embodiment can achieve downsizing compared with the parking device 1A according to the comparative example.

Figure 6:
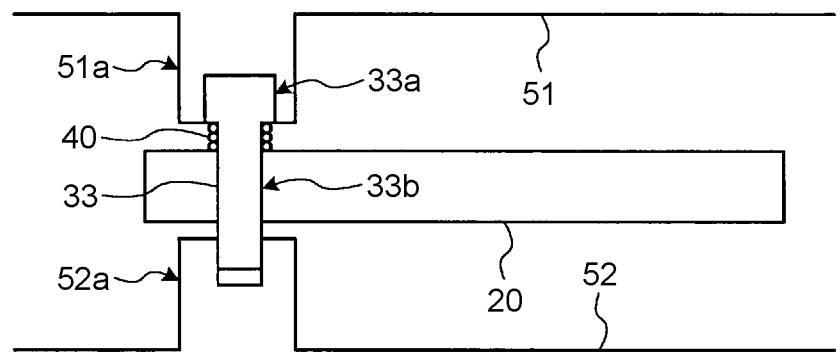
FIG. 6 is a schematic view showing how the parking pawl is supported in a modified example of the embodiment.

FIG. 6 is a schematic view showing how the parking pawl 20 is supported in a modified example. As shown in FIG. 6, in the parking device 1 according to the modified example, a parking pawl fulcrum pin 33 that pivotably supports the parking pawl 20 is composed of a large-diameter portion 33a that is provided at one end of the parking pawl fulcrum pin 33 and has a larger outside diameter than the torsion spring 40, and a small-diameter portion 33b that has a diameter smaller than that of the large-diameter portion 33a and substantially equal to the inside diameter of the torsion spring 40. The large-diameter portion 33a of the parking pawl fulcrum pin 33 is held by the housing boss 51a. The small-diameter portion 33b of the parking pawl fulcrum pin 33 is held by the case boss 52a. The torsion spring 40 is fitted on the small-diameter portion 33b of the parking pawl fulcrum pin 33 located between the parking pawl 20 and the large-diameter portion 33a. As the torsion spring 40 butts against a side surface of the large-diameter portion 33a in an axial direction of the parking pawl fulcrum pin 33, the torsion spring 40 is restricted from moving toward the side opposite from the parking pawl 20 (i.e., moving upward in FIG. 6). This can prevent the torsion spring 40 from coming off from the one end side of the parking pawl fulcrum pin 33.

Providing the parking pawl fulcrum pin 33 with the large-diameter portion 33a serving as a restriction part that restricts the movement of the torsion spring 40 away from the parking pawl 20, as in the parking device 1 according to the modified example, can achieve a cost reduction by a simple configuration compared with providing the restriction part by processing the housing boss 51a of the housing 51 that is made of aluminum alloy etc.

Alternatively, for example, a plurality of protrusions (not shown) may be provided as the restriction part on an outer circumferential surface of the parking pawl fulcrum pin 30 as shown in FIG. 2 so as to be arrayed in a circumferential direction. The torsion spring 40 may butt against these protrusions such that the movement of the torsion spring 40 away from the parking pawl 20 is restricted and that the torsion spring 40 is prevented from coming off from the one end side of the parking pawl fulcrum pin 30.

What is claimed is:

1. A parking device, comprising:
a parking gear directly coupled to an axle;
a parking pawl that is pivotably supported by a fulcrum pin and provided with a claw configured to be able to mesh with a tooth space of the parking gear; and
a torsion spring that is fitted on the fulcrum pin and includes a first end of the torsion spring mounted on the parking pawl and a second end of the torsion spring mounted on a housing boss that is provided on a housing, the second end being positioned on an opposite side of the torsion spring from the first end,
wherein:
the fulcrum pin is provided with a restriction part configured to restrict a movement of the torsion spring away from the parking pawl in an axial direction of the fulcrum pin,
the restriction part is a large-diameter portion that is provided at an end of the fulcrum pin, an outside diameter of the large-diameter portion being larger than an outside diameter of the torsion spring; and
the restriction part is configured such that the movement of the torsion spring away from the parking pawl is restricted as the torsion spring butts against a side surface of the large-diameter portion in the axial direction of the fulcrum pin.

2. A parking device, comprising:
a housing including a housing boss;
a parking gear directly coupled to an axle;
a parking pawl that is pivotably supported by a fulcrum pin and provided with a claw configured to be able to mesh with a tooth space of the parking gear; and
a torsion spring that is fitted on the fulcrum pin and includes a first end of the torsion spring mounted on the parking pawl and a second end of the torsion spring mounted on the housing boss, the second end being positioned on an opposite side of the torsion spring from the first end,
wherein the parking pawl and the torsion spring are disposed in the housing,
wherein the housing boss restricts a movement of the torsion spring away from the parking pawl in an axial direction of the fulcrum pin, and
the housing boss has an outside diameter that is larger than an outside diameter of the torsion spring.

* * * * *